March 10, 1964

F. THOMA 3,124,730

ELECTROMECHANICAL FREQUENCY GENERATING
DEVICE FOR CLOCKS AND THE LIKE

Filed Feb. 10, 1958

Inventor
Fritz Thoma
By
Att'y.

March 10, 1964

F. THOMA 3,124,730

ELECTROMECHANICAL FREQUENCY GENERATING
DEVICE FOR CLOCKS AND THE LIKE

Filed Feb. 10, 1958

Inventor:
Fritz Thoma.
By [signature]
Atty.

Inventor
Fritz Thoma
By
Atty

March 10, 1964

F. THOMA 3,124,730

ELECTROMECHANICAL FREQUENCY GENERATING
DEVICE FOR CLOCKS AND THE LIKE

Filed Feb. 10, 1958

Inventor
Fritz Thoma
By
Att'y.

Inventor
Fritz Thoma
By
Atty.

United States Patent Office 3,124,730
Patented Mar. 10, 1964

3,124,730
ELECTROMECHANICAL FREQUENCY GENERATING DEVICE FOR CLOCKS AND THE LIKE
Fritz Thoma, St. Georgen, Black Forest, Germany, assignor to Kieninger & Obergfell, St. Georgen, Black Forest, Germany, a company of Germany
Filed Feb. 10, 1958, Ser. No. 714,404
Claims priority, application Germany Feb. 12, 1957
25 Claims. (Cl. 318—128)

This invention is concerned with an electromechanical frequency generating device for clocks and the like.

The primary object of the invention is to provide an electromechanical oscillator adapted to oscillate at relatively low acoustic oscillation frequencies and adapted for driving clocks and other appliances demanding accurate time keeping.

Electrical oscillation circuits have been constructed by using a non-linear quadripole in feedback relative to the input and the output. The natural frequency resulting in such as oscillation circuit is mainly determined by self-induction and capacitance of the entire circuit. It was difficult to produce in such oscillation circuit, without particular expenditures, electrical frequencies below the audible range. Purely electrical oscillation circuits have for this reason not been used in practice for driving clocks and similar mechanical devices. Other ways have therefore been proposed toward obtaining the desired results.

Copending application Serial No. 630,421, filed December 24, 1956, now Patent No. 2,974,265, describes a clock controlled electronically, preferably by means of a transistor circuit, comprising an oscillating member, preferably a pendulum, disposed in driving impulse-producing relationship with respect to two coils positioned in the oscillation path and coaxial thereto, the pendulum carrying preferably rod-like permanent magnet means at the end thereof. An important feature of the corresponding arrangement resides in the fact that the electrical oscillation circuit formed by the closely adjacent coils and the transistor is, on the one hand, operatively affected by the magnetic oscillator entering with one of its poles into the two coils and that its natural oscillation is, on the other hand, suppressed by electrical equalizing or compensating members allotted to at least one of the coils. Such a clock exhibits good time keeping and is largely independent of temperature influences, especially when the two coils, due to the manner of winding of the turns thereof or by mutual spatial disposition thereof, are mutually so closely coupled, that the input and output circuits of the electronic circuit, especially transistor circuit, exhibit as small a phase difference as possible. This may be obtained, for example, by winding one coil upon the other concentrically therewith.

The object in case of the above mentioned structure is, to produce for the drive of the mechanical oscillation system, for example, a magnet oscillating in the manner of a pendulum, electrical driving impulses which are as sharp as possible and exceptionally uniform.

The necessity to utilize for an electrodynamic pendulum drive impulses as sharp as possible has been recognized for decades in the technique relating to electrical contact-operating clocks and the problems arising therefrom have been solved by precision structure of the contacts. In substituting for the contacts a control free of contacts, especially in an inductive control, there appeared at first the difficulty resulting from the fact that the control impulses produced in a generator coil by an oscillating magnet, which in strict analogy to the electrical contact clock are to effect the current supplied to the motor coil for driving the magnet, are sinusoidal. The reason resides in the fact that at least one pole of the magnet carried by the pendulum is during the entire oscillating (π) in the coil, producing a sinusoidal voltage due to sinusoidal velocity changes and further due to the fact that all individual parts cooperating in the contact-free control, are so disposed that only one electromagnetic feedback is present. The sharp impulses are in comparison, in a contact clock, dependent upon the angular sectors of the control wheel which is moved by the pendulum. In case of disposing the generator coil in the input and the motor coil in the output of an electronic element, for example, an electronic tube or a transistor, as is, for example, described in United States Patent No. 2,260,847, only sinusoidal impulses can occur in the motor coil, because the magnet induces control impulses in the control coil depending upon the velocity of motion of the pendulum.

French Patents Nos. 1,090,564 and 1,092,411 and French Patent No. 65,772 (addition to 1,092,411) are concerned with the problem of obtaining from the comparatively flat induction impulses occurring at the input of the transistor, impulses as sharp as possible at the transistor output, that is, in the motor coil. The solutions proposed in these French patents include (a) the forming of a magnetic feedback for the centering of the field; (d) a driving coil (motor coil) which is as narrow as possible; and (c) placing together two magnet poles of identical polarity so as to obtain repulsion of the lines of the field and thereby producing a narrow field extending radially about the magnet axis.

Investigations underlying the invention have, however, shown that the problem posed and the solutions suggested, as noted above, go in directions that do not lead to a practically satisfactory solution because the dispersion of the magnetic field is too great, producing, therefore, despite the proposed expedients sinusoidal impulses, although such impulses exhibit greater steepness of their flanks.

The invention, therefore, departs principally from the path shown by the three above mentioned patents and proceeds instead along the lines of the first noted proposals.

In accordance with the invention, the posed problem is solved by connecting the input and output of an electrically controlled semi-conductor element, for example, a transistor, a double base diode, a ring modulator with ferrite core, a Hall probe or another suitable electronic element capable of producing distinct switch effects, in feedback over impedances in such a manner, that the frequency of the switching and therewith the electrical oscillation of the circuit is substantially determined by the delay interval of the feedback operation, for example, by the phase shifting of the electric current in two coils connected in feedback circuit.

In accordance with a particular embodiment of the invention, the oscillator arrangement comprises a transistor whose input and output are connected in feedback circuit by way of two relatively long coils containing, if desired, an iron core or a permanent magnet.

In accordance with another feature of the invention, a double base diode (filament diode) is employed as a switching semiconductor element, having in the input and output thereof a resistance depending upon the magnetic field, in the manner of a Corbino disk or a Hall probe, and a coil, which are in feedback over a magnet core embraced by the coil, the resistance dependent upon the magnet field being disposed in the air gap of the magnet core.

The operative effect of the invention is, that sharp block-shaped electrical voltage impulses are periodically produced in the coils or in one coil, such impulses being utilized for the control and/or for the driving of a mechanical appliance, for example, a clock, a record changer or a relay.

In accordance with a further feature of the invention, at least one coil is formed as a winding of a relay, for example, for a stepping mechanism.

A further feature of the invention is concerned with forming at least one coil as a winding of the stator of a synchronous motor.

In accordance with another feature of the invention, the iron core or the magnet core is disposed movable with respect to at least one coil. It may, for example, be formed to operate as an oscillating part of the regulator of a clock.

In accordance with a further object and feature of the invention, the electrical circuit is tuned as a high frequency circuit of several kilocycles and having electrical equalizing members allotted thereto, for example, a high ohmic resistor in parallel with the coil in the transistor output or a capacitor between the input and output of the transistor, for suppressing the electrical oscillations of the circuit so long as the oscillating core is outside the coil or coils. This feature, so far as it relates to a permanent magnet constituting the oscillating core, has been described in the previously mentioned copending application Serial No. 630,421.

The electronic circuit operates according to the invention as a quasi-stable electric oscillator such, that oscillations once triggered cannot be inherently maintained due to strong artificial damping, and that oscillation conditions triggered at its input appear in congruent form at the output, due to the mutual reciprocal action with the mechanical oscillation, particularly the oscillating magnet, for example, due to induction, causing by conversion into kinetic energy, for example, by means of a magnetic field, the desired maintenance of the low frequency mechanical oscillation.

This rule for proceeding achieves exactly the opposite of what is aimed at and achieved according to the three above mentioned French patents. While the teaching of the French patents aims at differences with respect to the impulses at the input and the output of the transistor, the teaching according to the invention requires complete similarity, whereby the input and output of the transistor are not realized as separated electrical concepts but as different branches of one and the same oscillation circuit with overlapping characer, that is, as closely mutually coupled electrical transmission members of an electrical blocking oscillator, wherein the frequency-determining member, for example, the pendulum, releases the impulses at predetermined amplitude positions.

It is, therefore, not absolutely necessary that the impulses produced by the electrical oscillation circuit are rectangular impulses.

Accordingly, there may be employed a resistance-capacitance-flip oscillator synchronized by the electro-mechanical oscillating system, whose frequency is determined by an R-C member.

In accordance with a particular embodiment of the invention, upon using two coils, disposed in the input and output circuit of the oscillator and cooperating reciprocally with the mechanical oscillator, as electrically mutually coupled transmission members, the length of the motor coil and its position relative to the return positions of the oscillating remanence body, particularly the magnet, may be such, that the corresponding body, shortly before attaining its greatest kinetic energy, begins to enter the coil with one pole and that it fills the coil substantially completely in the second return position which it thereupon reaches.

In order to determine the electrical data of the electrical oscillation circuit, especially the length, the diameter of the ohmic resistance and the number of ampere windings of the coils as well as the field strength and the dimensions of the magnetic oscillator, the following basic rules are to be observed:

Since the mechanical oscillator is to control itself by its reciprocal action with respect to the electronic oscillator, the mechanical torque, for example, of a pendulum or a balance, or the mechanical inertia of an oscillator executing approximately longitudinal oscillations, and the electromotive forces of the electrical drive system must be in balance. Any influencing of the isochronism of the mechanical oscillator that may be reflected in the induced voltage of the generator coil must be imparted unaltered, that is, without change as to frequency or shape, to the mechanical oscillator, as a drive impulse with increased energy content.

For example, if the pendulum is accelerated by an external impact, or if its amplitude is reduced, the resulting condition must be automatically equalized or compensated by alteration in the energy supply. In the case of increased amplitude, the electrical energy supply must be reduced for, since the velocity of the pendulum at zero transition (assuming fixed position and dimensioning of the coil) is increased, the electrical impulse length is reduced with respect to the total amplitude and the electrical drive is therefore actually lessened. It will be seen, therefore, that a difference will appear between the pendulum action and the electromotive force of the drive system which is operative to restore automatically the balance between the mechanical and the electrodynamic energy potential.

In order to secure the above explained operation at any rate satisfactorily and without energy losses, the switching element, for example, the transistor through which the electrical and the mechanical oscillation systems are mutually coupled, must be dimensioned so that the voltage induced at the transistor input is transmitted congruently to the output, even in a case where the input voltage is modulated by external influences that disturb the isochronism of the pendulum. The sole difference between the input and output circuits of the transistor shall reside therein that the energy required in the output circuit for the driving of the mechanical oscillating system is supplied by a battery disposed in the output circuit and is therefore with respect to the amplitude at any time amplified as compared with the input energy.

In order to meet the explained requirements, it will be necessary, in the construction of an electrical clock with feedback circuit, to observe the following sequence with respect to the dimensioning of the individual structural parts:

A pendulum with a desired frequency, stability and directional characteristic, is given a certain inertia. At a predetermined pendulum deflection, between 3° and 7° has been found suitable for short pendulums, a permanent magnet fastened upon the pendulum and corresponding with respect to position, size and dimensions to predetermined data, produces in a coil with respect to the interior of which it oscillates, a voltage impulse of predetermined length, amplitude and amplitude position, and at the same time a current impulse opposing the entry of the permanent magnet into the coil, constituting a damping effect based upon counter-induction.

The transistor is made conductive due to the voltage impulse produced in the generator coil lying in the transistor input, with the negative potential of the impulse connected to the base of the transistor.

Since the motor and generator coils are in accordance with the invention mutually coupled so that they produce with the transistor an oscillation circuit, the oscillation circuit would begin to oscillate unimpeded in response to an inductive excitation, for example, in case of a short pendulum. There are therefore provided electrical equalizing or compensating members, as already previously proposed, for suppressing the oscillations, however, only to such extent, as to prevent the circuit from oscillating due to temperature fluctuations (−30° C. to +60° C.) and the inherent conductivity of the transistor caused thereby and, on the other hand, to prevent oscillation responsive to a voltage impulse of predetermined magnitude caused by the permanent magnet, and to suppress the oscillation again when the corresponding voltage is not reached. This may be effected by means of the customary emitter circuit with inductive feedback either by current feedback coupling or voltage feedback coupling. The current feedback may be effected by connecting to the outer resistance, that is, of at least one of the two coils, an ohmic resistance in parallel thereto. The voltage feedback may be effected by feeding back the output voltage to the input by utilizing the phase shift of a capacitor connected between the emitter and the base. Both features may be applied in combination.

It is necessary for the realization of the invention, that the input and the output of the oscillation circuit be mutually coupled in such a manner or that the equalizing or compensating members be correspondingly dimensioned, so that oscillation of the circuit is possible only if there is a remanence body, particularly in the magnet material, at least in one of the coils. The circuit is, moreover, to be tuned and the effective working point of the switching element especially the transistor, is to be positioned so that during a predetermined amplitude position of the permanent magnet carried by the pendulum, relative to a closely coupled coil arrangement, the damping of the circuit is for the predetermined time of the driving impulse cancelled by the presence of the remanence-containing body in at least part of a coil, permitting opening of the transistor and release of the current impulse from the battery.

The various objects and features of the invention will appear from the description which will be rendered below with reference to the accompanying drawings showing some embodiments of the frequency generating drive according to the invention. In the drawings.

Figure 1:
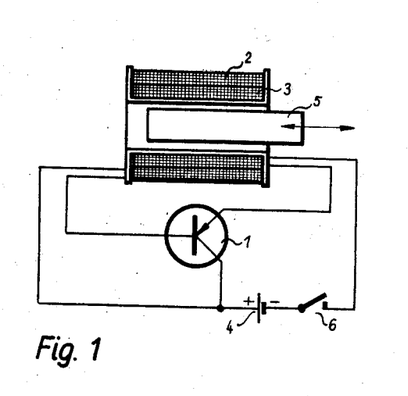
FIG. 1 shows a frequency generating device according to the invention, comprising two coils in feedback circuit with the input and output of a transistor and an iron core which is displaceable with respect to the coils.

In FIG. 1, numeral 1 indicates a transistor connected in collector circuit, with the input and output in feedback by way of two induction coils. The two coils are coaxially wound one upon the other top rovide for good coupling. Numeral 4 indicates a battery and 5 an iron core, for example, a ferrite core. The electrical circuit begins to oscillate, surprisingly at very low frequency, responsive to closure of switch 6. Oscillation with a frequency on the order of 10 cycles may be obtained with proper dimensioning of parts. The frequency may be affected by axially shifting the magnet core 5.

Figure 2:
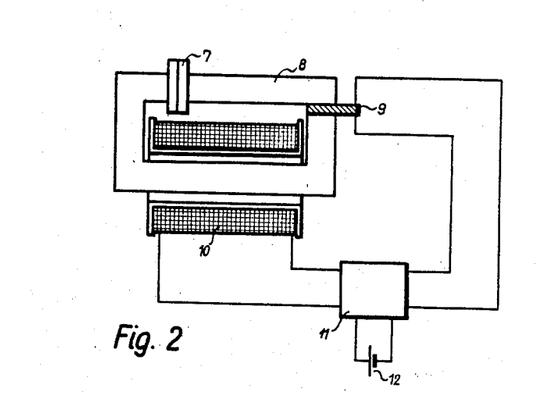
FIG. 2 illustrates an embodiment comprising a double base diode having the input and output thereof connected in feedback circuit by way of a single coil with fixed iron core and a resistor member dependent upon the magnetic field.

FIG. 2 shows an embodiment comprising a filament diode (double base diode) having in the input and output circuit a resistance 9 which depends in the nature of a Corbino disk upon the magnetic field, or a Hall probe, and a coil 10, respectively, which are in feedback over the magnet core 8, the resistance 9 being disposed in the air gap of the core. Numeral 12 indicates the voltage source for the filament diode and 7 indicates a magnetic delay member. The operation of this embodiment is as follows:

In the switched-off condition or in idling the Corbino disk has low electrical resistance and as a consequence, the double base diode, upon switching-in, will flip over causing current to flow in the coil 10 connected to its output, the current building up a magnetic field. The electrical resistance of the Corbino disk 9 is thereby increased, making the double base diode 11 unstable, thereby causing disconnection of the current from coil 10, whereupon the interplay of the parts is repeated. The frequency may be varied by means of timing members or magnetic delay means on the core 8, for example, a shunt ring.

The frequencies obtained with the device according to the invention are so low that they may be used for operating a relay to drive the pointers of a clock without employing any further frequency division.

The embodiment according to FIGS. 3 to 8 is concerned with a portable electric time piece, for example, a wristwatch or a pocket watch, comprising as a source of energy an electrical storage device, especially a battery or an element incorporated in the watch, for example, disposed therein or thereon and connected with the frequency generating device according to the invention which drives a synchronous motor for driving the watch mechanism.

The generation of the constant frequency, for regulating the watch operation, directly in back of the electrical energy source, results in the advantage that operation can be effected by means of a synchronous motor adapted to drive the pointer mechanism directly or by means of a suitable gear. The synchronous motor may be provided with an interlock for securing rotation in desired direction.

The synchronous motor is in the illustrated example provided with a peripheral rotor. The direction of rotation is obtained by applying the split pole principle. The motor is a Warren or hysteresis motor comprising the following four parts, namely (a) a magnet or drive core made of dynamo sheet; (b) an exciter coil; (c) a steel disk and rotor drum made of cobalt steel; and (d) a shunting ring of copper.

The described structure may be combined, for example, with photocell means for continuously recharging in known manner the electrical energy source, especially a battery.

In accordance with a feature of the invention, extremely little space is required by using as a battery charging means a generator adapted to produce current by relative motion between its parts. The movable part of the generator is to be formed and journalled so that its oscillating motion extends over an angle of about 300°, the remaining angular range being utilized for accommodating the energy source, for example, the battery. It is in this manner, in accordance with the invention, possible, to build up the watch in layers or levels, including a first layer containing the battery and the recharging means, a second layer containing the electronic oscillator and the synchronous motor driven thereby, and arranging the coils for the synchronous motor forming also the coils for the oscillator, rotation-symmetrically upon the circumference of the layer and surrounding the rotor as well as the wheel mechanism of the clock and the switching elements of the oscillator. The dial may serve as a core for the second layer.

The generator or recharging device may also be constructed so that the permanent magnet forming the oscillating armature instead of being in sector form, is driven in known manner by a pendulum gear as used, for example, in automatic clocks.

Figures 3, 4:
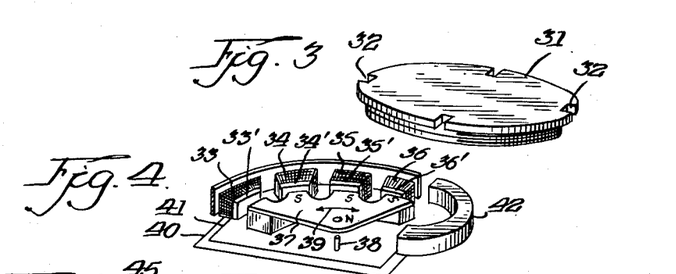
FIGS. 3 to 8 show as an example the structure of a watch driven by an oscillator comprising two coils in feedback circuit with the input and output of a transistor and an iron core forming the stator of a synchronous motor.

FIG. 3 shows the back cover 31 of the electric watch according to the invention. The gaps 32 serve for the tool required for screwing the cover in place.

FIG. 4 shows the first level or layer disposed adjacent the cover 31. It comprises an annular member 42 associated with the battery and carrying a number of serially connected induction coils 33, 34, 35, 36 each having an iron core respectively indicated at 33', 23', 35', and 36'. Numeral 37 indicates a segment shaped oscillating member made of iron and rotatably journalled at 38. The member 37 is magnetized in such a manner that its north pole appears near its journal, a plurality of south poles 35 separated by notches appearing marginally thereof. The member 37 may also be magnetized so as to provide south poles alternating with north poles. The coil circuit must in such a case be in accordance with a Graetz rectifying system. Motions imparted to the watch causes oscillations of the member 37 in the direction of the arrow 39, thereby generating in the coils 33 to 36 current impulses which are conducted by way of conductors 40, 41 to a highgrade battery, accumulator or other chargeable element. The oscillations of the member 37 are limited by stops such that a sector of about 60° remains for placing the battery. The member 37 may consist of highgrade ferrite material.

Figures 5, 6, 7:
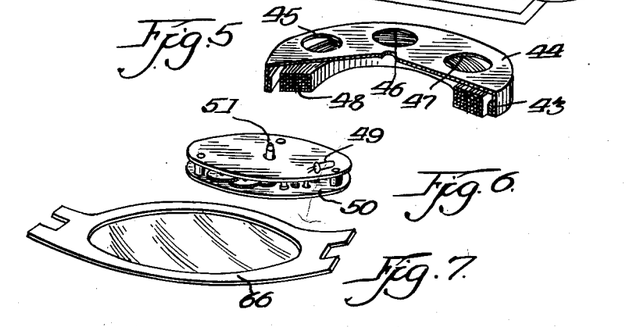

FIG. 5 shows the second layer of the watch according to the invention. Numeral 43 indicates a hysteresis ring of cobalt steel and 44 a sheet part belonging to the rotor of the motor, openings 45, 46, 47 being formed therein to reduce the weight. Numeral 48 indicates windings of two coils wound one upon the other and electrically well coupled, one coil being for the stator of the synchronous motor, the coils being respectively connected with the input and output of a transistor 49 (FIG. 6) which is connected with the battery.

FIG. 6 illustrates the drive mechanism with its necessary step-down gears and also the switch means, for example, the transistor or diode. The axis for the rotor is shown at 51 and 50 is the dial plate.

FIG. 7 shows the casing closure member 66 forming the last layer in the assembly.

Figure 8:
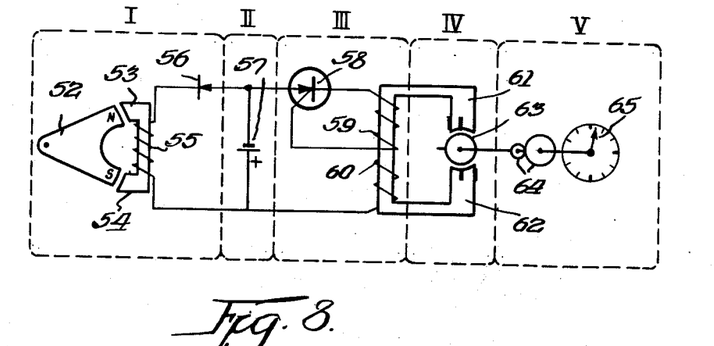

The circuit, as shown in FIG. 8, comprises five principal portions or sections I to V.

Section I comprises the oscillating member 52 having two poles N and S adapted to move with respect to the pole shoes 53, 54 of the generator coil 55. Rectifier 56 confines discharge of the battery in desired direction and rectifies the alternating current produced by the oscillations of the member 52.

Section II contains the electrical storage means in the form of a battery 57.

Section III comprises the electronic oscillator which converts the direct current from the battery into alternating current, at the same time forming the frequency regulator for the watch. In the illustrated example, this oscillator comprises a transistor 58 having in its input and output circuit coils 59 and 60, respectively.

Section IV contains the drive motor which is frequency-regulated by the operation of the part disposed in section III, the motor being a synchronous motor with split poles 61 and 62 and a pole wheel rotor 63.

Section V comprises the gears 64 and the pointer means 65.

Figure 9:
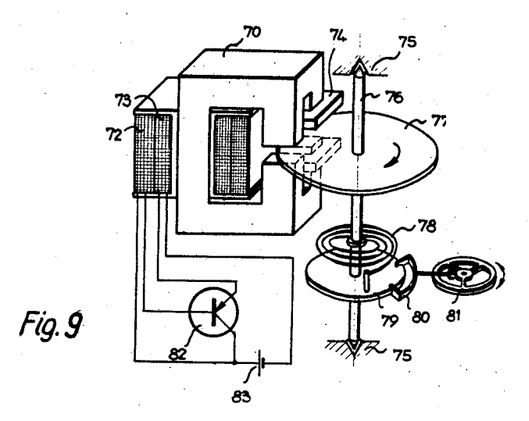
FIGS. 9 to 12 show two embodiments of an oscillator arrangement each comprising a stationary magnet core forming the stator for a rotor or oscillator operating according to the Ferraris principle.

FIG. 9 shows an embodiment operating in accordance with the Ferraris principle, comprising an iron package 70 the core of which is surrounded by two coils 72 and 73 disposed in the input and output circuits of a transistor 82 connected with a current source 83. Relatively low magnetic alternating frequencies are produced in the iron core 70 by the electronic switching circuit which may also provide for amplification. The electromagnet 70 has two pairs of poles, one of which is provided with shunting rings 74, whereby the magnetic field built up between this pole pair is shifted by 90° relative to the magnetic flux of the other pole pair. Numeral 77 indicates an aluminum disk forming the Ferraris rotor. The disk is frictionally disposed upon the shaft 76 which is journalled at 75. Numeral 78 indicates the hairspring of a watch or clock having the drive wheel 79 and numerals 80 and 80 respectively indicate an armature and a balance. The operation is as follows:

The continuously operating magnetic field imparts to the disk 77 a torque which is limited by the frictional covering, thereby continuously tensioning the hairspring 78 by a certain angular amount for driving the watch gear for the corresponding portion.

Figure 10:
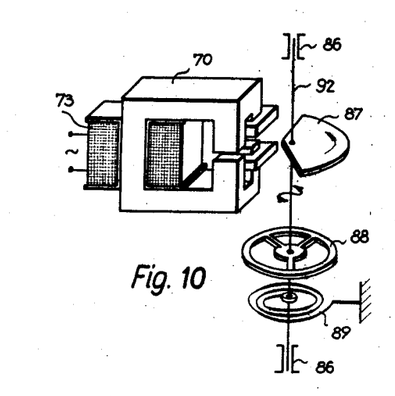
Figure 11:
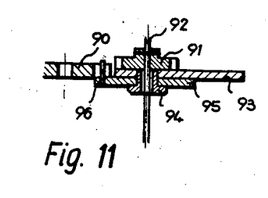
Figure 12:
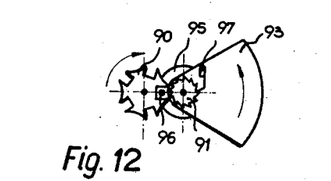

FIGS. 10 to 12 show another embodiment in which the Ferraris rotor drives the drive regulator directly, that is, without an interposed drive reserve as in FIG. 9. Upon a shaft 92, journalled at 86, there is disposed a centrifugal mass 88, similar to a balance, and an aluminum disk 87 constituting the Ferraris rotor, such disk being in the form of a segment extending preferably over about 90°. Numeral 89 indicates a spiral spring one end of which is fixed to the casing, such spring imparting to the shaft 92 an elastic directional force. The operation is as follows:

When the oscillating system swings in the direction of the arrow, in anticlockwise direction, the aluminum disk will enter the air gap of the two magnetic alternating fields which are shifted spatially and with respect to time by 90° and is accelerated in the direction of the field rotation by eddy currents induced thereinto. As soon as the segmental disk 87 leaves the air gap of the core 84, the structure will swing freely to a point of reversal which is determined by the gear arrangement illustrated in FIGS. 11 and 12. At this point, the disk 87 will be stopped when the shaft 92, due to the force of the spring 89 attempts to rotate in opposite direction. The aluminum disk 87 remains locked in this position by the action of the pawl 97 shown in FIG. 12. The disk 87 is carried along again when the balance 88 reaches its second reversal point. The disk 87, therefore, can rotate only in one direction and is impeded to rotate in opposite direction by the pawl 97 fixedly disposed thereon, such pawl cooperating with a locking wheel 91 which is fixedly connected with the shaft 92 of the balance 88.

FIG. 11 shows more clearly the manner in which the individual parts are arranged on the shaft 92. The disk 93 is connected with a disk 95 by means of a bushing 94, the disk 95 carrying peripherally a switching pin 96 adapted to enter into the gaps of a Maltese cross 90 and advancing it by one tooth incident to each oscillation. The Maltese cross is formed so as to serve also for blocking return rotation of the disk 93. The locking wheel 91 with the pawl 97 serves as a coupling between the shaft 92 and the segment 93 which is rotatable in one direction only.

Figure 13:
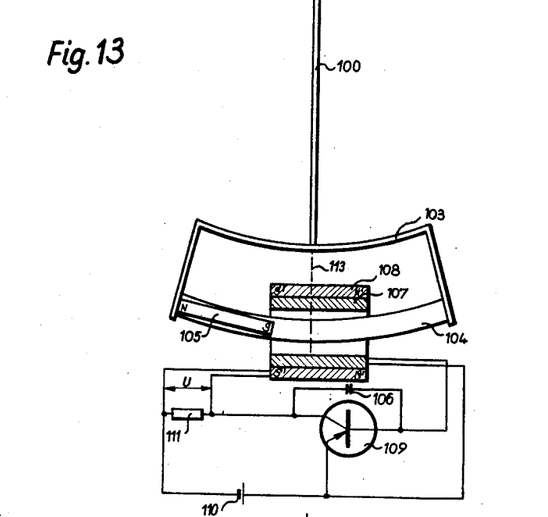
FIGS. 13 and 14 represent an oscillator embodiment comprising a periodically swinging magnet core carried by the pendulum of a clock.

In accordance with FIG. 13, the core which is movable with respect to the oscillator coils is formed in the manner of a magnetic pendulum oscillator. Numeral 100 indicates the pendulum rod which is rotatable about a fixed point 102, the rod carrying a bracket 103 supporting an arcuate bar 104 made of brass or other electrically well conductive but non-magnetic material. The bar 104 is hollow, at least for a portion at the left and thereof and contains a permanent magnet 105 having the poles N and S. Numerals 107 and 108 indicate concentrically wound coils of identical length, the inner coil 107 being connected to the input and the coil 108 to the output of a transistor 109. When the transistor is open, the outer coil 108, acting with respect to the magnet 105 as a motor coil, will be connected to a current source 110 which may be a commercially available battery, for example, a primary element or an accumulator with a charging device in the form of a commercially available battery. An ohmic resistance 111 and/or a capacitor 106 may be provided to act as compensation members causing damping of the electrical oscillations of the oscillating circuit comprising the coils 107 and 108 and the transistor 109 with the battery 110. The two coils 107 and 108 are wound such that the damping of the circuit is reduced by the south pole of the oscillating magnet and the induction action as well as the inductivity alternation, in at least one coil, to such an extent that the circuit is caused to oscillate, producing thereby drive impulses of rectangular shape resulting from the feedback frequency. These modulated direct current impulses produce in the motor coil a field N'—S' which is operated to repulse and to attract the permanent magnet, respectively.

Figure 14:
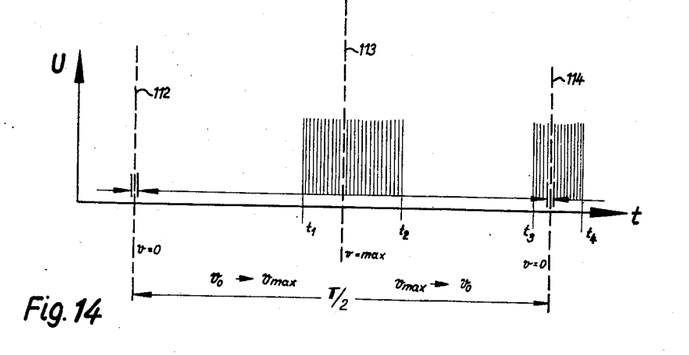

The vertical dotted line in FIG. 14 indicates the symmetry position of the pendulum which has in the neighborhood thereof the greatest velocity. The inertia of the pendulum and the driving impulses delivered by the electrical circuit and the magnet 105 are mutually tuned so that the pendulum has an amplitude of about 5°.

The coils 107, 108 are arranged so that the south pole of the oscillating magnet 105 is in its right hand reversal position aligned with the north pole N' of the coils. The length of the coils and the position of the poles S' are such that the south pole S of the magnet 105 passes the pole S' shortly before reaching maximum velocity; such is approximately the case when the magnet 105 is spaced from its return position by one-half amplitude, that is, the fourth part of the path from the left hand to the right hand reversal position. The length of the magnet 105 corresponds at least to the length of the coils.

The electrical voltage impulses U occurring in the motor coil 108 during one oscillation of the pendulum from left (112) to right (114) are in FIG. 14 plotted against the time $t$ during which the pendulum sweeps once through the entire path. The magnet 105 has at an instant when it enters approximately into the coils at the left thereof a velocity so high that the induction impulse generated thereby in the coil 107 is sufficient to make the transistor 109 conductive. The oscillating circuit $t_1$, accordingly, begins to oscillate, immediately with the full amplitude determined by its electrical values, such amplitude being independent of the magnitude of the original induction surge in the coil 107. The oscillations which are in accordance with the tuning of the circuit generally between 1000 and 10,000 cycles, in the example at 4000 to 5000 cycles, persist to the time $t_2$, when the velocity of the magnet 105 has decreased again, so that the induced impulses are in the coil 107 below the excitation threshold of the working point of the transistor circuit 109. There is in this manner between $t_1$ and $t_2$ produced a rectangular impulse with extremely steep flanks, which is modulated by the high frequency oscillations, acting with the field produced in the motor coil as a drive impulse with respect to the oscillator 105. The frequency corresponds to the timing of the entire circuit. The impulse is produced simultaneously in both coils 107 and 108, with the only difference, that the current in the coil 108 is about 10-times that in the coil 107.

Shortly before reaching its right hand reversal position, indicated in FIG. 14 at 114, the magnet produces at $t_3$ another oscillation in the electrical circuit, which is caused by the remanence change within the coils, since the coils are in this reversal stage entirely filled with the magnet 105. This condition causes detuning of the oscillation circuit, cancelling at the time $t_4$ the damping effected by the members 111 and/or 112, the magnet 105 filling the coils only partially, so that the damping of the members 111, 112 suffices to terminate the oscillations. The second impulse $t_3$ to $t_4$ does not effect driving of the magnet, serving for the stabilization of its terminal position and therewith of its amplitude. The stabilization impulse is not absolutely required for maintaining the pendulum oscillation, but it improves to a surprising extent the running precision of the frequency generator and therewith of the time piece.

Such a stabilizing impulse does not occur in left hand reversal position since there is at the corresponding instant no iron in the coil. The bar 104 is made of electrically conductive material, for example, brass, copper or aluminum. Investigations on which the invention is based have revealed that non-magnetic conductors, especially metals other than iron, dampen and suppress the oscillation or hunting tendency of the quasi-stable oscillator comprising the members 107 to 112, while they increase the HF oscillation frequency by about ⅓; presence of iron containing or magnetic material in the coils favors the hunting tendency while greatly reducing the oscillation frequency (to about 1/100 part thereof).

Other embodiments are possible. The electrical quasi-stable oscillator circuit may be realized differently; other elements may be substituted for the transistor or for supplementing it; and the quasi-stability may be effected or supplemented by other means.

Figure 15:
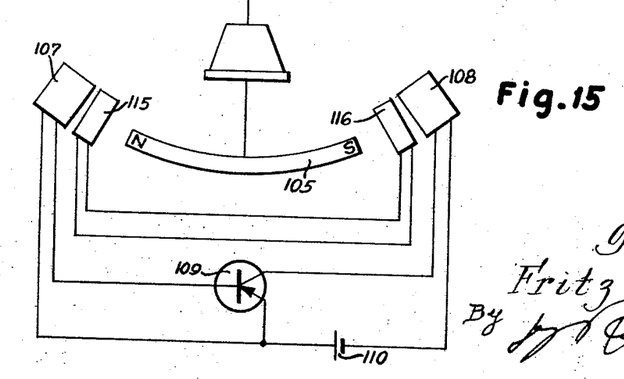
FIG. 15 shows an embodiment with a swinging magnet core and two separate coils and an auxiliary coil for the close coupling thereof.

In accordance with FIG. 15, the coils 107 and 108 need not be wound one upon the other but may be separately disposed and electrically coupled, preferably inductively by means of auxiliary coupling coils 115, 116.

Figure 16:
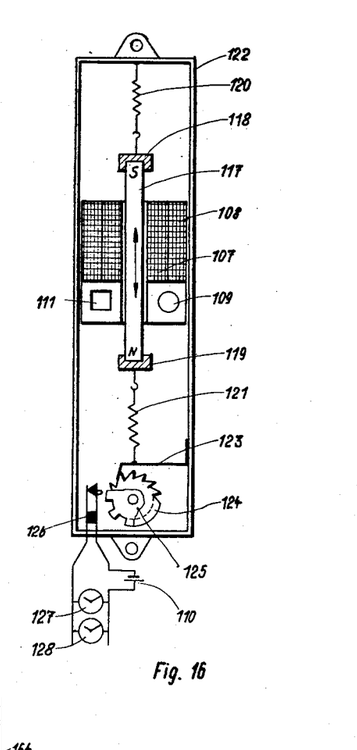
FIGS. 16 and 17 illustrate embodiments comprising longitudinally oscillating magnet cores.

FIG. 16 shows an embodiment in which the electrical circuit is similar to the one shown in FIG. 13, but providing in place of the pendulum a longitudinally movable oscillator such as it has not been used heretofore in connection with clocks and the like.

Numeral 117 indicates a barlike magnet which is by means of end caps 118, 119 vertically suspended between two cylindrical springs 120, 121, spring 120 being anchored in the casing 122 and spring 121 being connected with an elastic switching pawl 123 which may be in the form of a leaf spring. Numerals 107 and 108 indicate the two induction coils, 109 the transistor and 111 the damping resistor. The resilient pawl transmits the mechanical oscillations to a ratchet 124. The frequency is determined by the oscillating mass and by the resilient members cooperating therewith and may be affected by varying the tension of at least one of the suspension springs. The spring 120 may for this purpose extend from a regulating screw.

The resilient members may take different form and may be differently disposed; one spring may, for example, be omitted. Other elastic or resilient linearly movable members, rods and the like, may be used.

The pawl 124 drives a cam wheel 125 adapted to close contact 126 periodically, such contact controlling or synchronizing, for example, two secondary clocks 127, 128 by way of a circuit including a battery 110.

Figure 17:
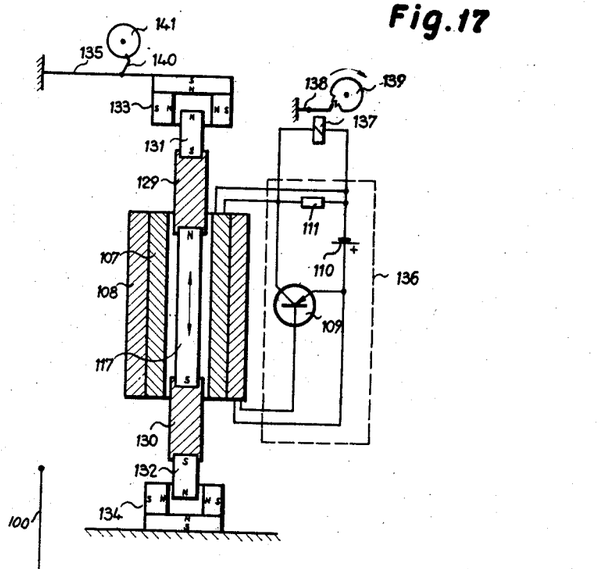

FIG. 17 shows a modification of the structure illustrated in FIG. 16. Numerals 129 and 130 indicate two non-magnetic barlike members interconnected by a permanent magnet 117. At the opposite end of members 129, 130 are permanent magnets 131, 132, connected therewith, adapted to enter similarly polarized magnetic pot journals 133, 134, one of these journals (134) being fixedy disposed and the other (133) being mounted upon a leafspring 135. Each journal comprises a radially magnetized annular magnet and an axially magnetized closure plate. The magnet 117 is, by the operation of the oscillating system comprising the two induction coils 107, 108, transistor 109, balance or compensation resistor 111 and the current source, caused to oscillate as described before. The return-drive force of the magnetic journals 133, 134, cooperating in the oscillation enters elastically in determining the oscillation frequency.

The oscillations produced in such system may be utilized in various ways, two of which are indicated in FIG. 17. One way provides for tapping from one of the coils, especially the coil 107, the generated current and voltage pulses, in the electronic feedback circuit 136, for affecting an electromagnet 137 having an armature 138 acting as a pawl, to drive the ratchet 139 of a stepping mechanism which may serve for driving secondary or subsidiary clocks. The other way is to utilize the motions of the leafspring 135 for actuating a pawl 140 which drives a ratchet 141. The ratchet 141 may be employed for driving a master clock, or for tensioning a power storage device, for example, a drive reserve spring of a clock or the like.

Figure 18:
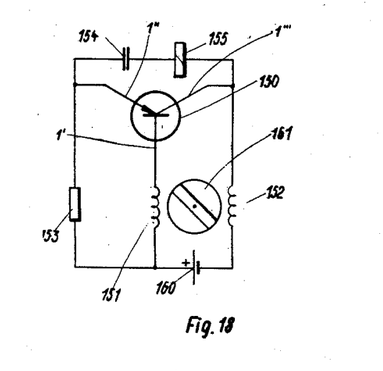
FIGS. 18 and 19 show embodiments comprising an electrical R-C oscillating circuit which is synchronized by a magnetic oscillator operating as a balance.
Figure 19:
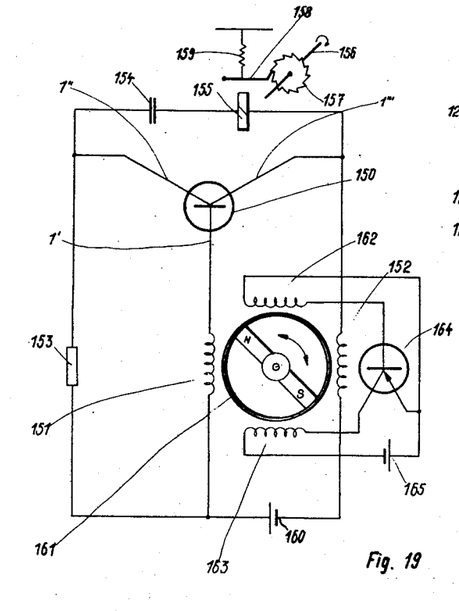

FIGS. 18 and 19 illustrate two embodiments of an electronic low frequency circuit operating as a generator, the electronic circuit being in reriprocal coaction with a bar-like magnet executing mechanical oscillations in the manner of a balance or an oscillation generator, especially rotary or angular oscillations which are synchronized with the oscillations of the electrical circuit.

Numeral 150 in FIGS. 18 and 19 indicates the transistor with the base 1', the emitter 1" and the collector 1'". Numeral 151 indicates the base resistor having a resistance of several hundred ohms. The collector resistance 152 has a few kilo-ohms and the emitter resistance has about 100 ohms. For the low frequency oscillation circuit, there is provided the R-C member comprising a capacitor 154 and a coil 155, the latter forming part of the stepping mechanism 156. The battery 160 delivers a voltage of about 1 to 4 volts.

As is apparent from FIG. 19, the stepping mechanism comprises a ratchet 157 which is actuated by a pawl 158 controlled by the coil 155. Numeral 159 indicates the restoring spring for the pawl 158.

In accordance with FIGS. 18 and 19, the resistors 151 and 152 are in the form of coils acting upon a mechanical oscillator 161 in the shape of a permanent magnet included in a balance. This balance stabilizes the frequency of the entire system, so that voltage and temperature influences cannot affect the frequency, and reducing the voltage dependence to a minimum.

As shown in FIG. 19, in order to obtain with simple means a greater accuracy of the produced frequency, there may be used a circuit acting as an amplifier, comprising a further semiconductor element for the amplitude damping of the mechanical oscillating system.

The oscillating permanent magnet produces in the presence of an excessively high amplitude an induction voltage in the trigger coil 162, which excites the transistor 164, thereby building up a field in the coil 163 which limits the amplitude of the mechanical frequency regulator. Numeral 165 indicates the required battery.

Changes may be made within the scope and spirit of the appended claims.

I claim:

1. A battery-operated generator for watches, clocks and other constant-speed apparatus, comprising a magnetic member and circuit means cooperably disposed for periodic repetitive movement relative to each other, said circuit means having an input circuit, an output circuit and feedback means, said feedback means comprising a first coil connected in the input circuit of said circuit means, and a second coil inductively coupled to the first coil and connected in the output circuit of said circuit means, operative to generate a burst of pulses of relatively high frequency compared to the frequency of said periodic movement, responsive to each period of said relative movement between the magnetic member and the circuit means, dependent on the relative velocity therebetween, said circuit means being dimensioned to determine the relatively high frequency of the pulses of the periodic pulse bursts, such pulse bursts being operative to maintain periodic movement between the circuit means and the magnetic member.

2. A generator as claimed in claim 1, wherein the frequency of the pulses is between 1,000 and 10,000 c./s.

3. A structure and cooperation of parts according to claim 1, comprising a transistor constituting said control element, relatively long principal coils constituting said impedances, and means for connecting the input and output of said transistor in feedback over said principal coils.

4. A structure and cooperation of parts according to claim 3, wherein said principal coils are spatially separated, and auxiliary coil means electrically connected with said principal coils.

5. A structure and cooperation of parts according to claim 4, wherein at least one of said auxiliary coil means is movable with respect to the principal coil respectively cooperating therewith for variable adjusting the coupling between said principal coils.

6. A structure and cooperation of parts according to claim 4, wherein said auxiliary coils exhibit structural dimensioning respectively matched to the principal coils cooperating therewith.

7. A structure and cooperation of parts according to claim 4, comprising switching means disposed in circuit with said auxiliary coils.

8. A structure and cooperation of parts according to claim 3, comprising timing member means in said feedback circuit.

9. A structure and cooperation of parts according to claim 1, wherein said principal coils form part of a synchronous motor having a permanent magnet rotor.

10. A structure and cooperation of parts according to claim 9, comprising an electromagnet having laminated pole shoes embracing said principal coil plierlike and forming adjacent thereto a pole assembly enclosing a pole wheel.

11. A structure and cooperation of parts according to claim 10, wherein said principal coil means forms at least in part stator coil means with split poles to effect operation of said motor in accordance with the Ferraris principle.

12. A structure and cooperation of parts according to claim 11, comprising spring means controlled by the rotor of said motor for storing energy for a part to be driven.

13. A structure and cooperation of parts according to claim 12, comprising a shaft for said Ferraris rotor, and locking means for coupling said rotor with said shaft for rotation in a predetermined direction.

14. A structure and cooperation of parts according to claim 13, comprising locking means including a Maltese cross coupled with a part to be driven, and a balance wheel carried by said shaft.

15. In a battery-supplied, contact-free low frequency mechanical frequency generator for devices requiring constant control frequency, an electronic circuit including a control element, constituting a quasi-stable electrical oscillator incapable due to damping to maintain oscillations automatically, a mechanical oscillator in reciprocal operation with the circuit of said control element, said circuit producing electrical impulses for said mechanical frequency generator, and means for connecting the input and output of said element in feedback by way of principal impedance coil means, the frequency produced being substantially determined by the delay time effected by said feedback, triggered oscillation conditions occurring at its input appearing in congruent form at its output and causing maintenance of said mechanical oscillations.

16. A structure and cooperation of parts according to claim 15, wherein said mechanical oscillator is a permanent magnet.

17. A structure and cooperation of parts according to claim 15, wherein said permanent magnet begins to enter the motor coil shortly before reaching maximum velocity and filling said coil fully upon subsequently reaching its reversal position.

18. A structure and cooperation of parts according to claim 17, wherein said principal coils are wound such that damping of the circuit is reduced by the action of the south pole of the oscillating magnet due to induction and inductivity changes, causing decay of the oscillations in said circuit to produce drive impulses of rectangular shape.

19. A structure and cooperation of parts according to claim 18, comprising compensation members for controlling said damping to effect operative actuation of said control element.

20. A structure and cooperation of parts according to claim 19, wherein said compensation members operate such that the feedback effected thereby is blocked responsive to filling of at least one principal coil by said magnet.

21. A structure and cooperation of parts according to claim 20, comprising means for impeding close coupling of said principal coils for predetermined intervals.

22. In a battery-supplied contact-free, low frequency mechanical frequency generator for devices requiring constant control frequency, an electronic circuit including a control element, and having annularly shaped input and output impedance coils concentrically wound one upon the other and with said control element forming a feed back oscillatory circuit for producing electrical impulses for said mechanical frequency generator, the latter including a reciprocable magnetic element arranged to reciprocate within said concentric coils whereby the latter are substantially simultaneously and identically effected thereby.

23. A structure and cooperation of parts according to claim 22, comprising means for suspending said reciprocable element for longitudinal motion between members, at least one of which is resiliently supported.

24. A structure and cooperation of parts according to claim 23, comprising magnetic journal means for said reciprocable element.

25. A structure and cooperation of parts according to claim 23, wherein said reciprocable element comprises a rodlike member which is at least partially magnetic, means for journalling said member in radially magnetized annular bearing means, and means for bracing said member in one direction by an axial magnetic field.

References Cited in the file of this patent

UNITED STATES PATENTS

| | | |
|---|---|---|
| 2,785,356 | Nisle | Mar. 12, 1957 |
| 2,843,742 | Cluwen | July 15, 1958 |
| 2,852,243 | Shepard | Sept. 16, 1958 |
| 2,957,116 | Hurd | Oct. 18, 1960 |
| 2,962,643 | Kwartiroff | Nov. 29, 1960 |
| 2,986,683 | Lavet | May 30, 1961 |

FOREIGN PATENTS

| | | |
|---|---|---|
| 746,465 | Great Britain | Mar. 14, 1956 |
| 1,153,306 | France | Sept. 30, 1957 |